US009472042B2

(12) United States Patent
Hassenzahl

(10) Patent No.: US 9,472,042 B2
(45) Date of Patent: Oct. 18, 2016

(54) CONTROLLABLE KIOSK RETURN GATE

(75) Inventor: Steven Hassenzahl, Snellville, GA (US)

(73) Assignee: NCR CORPORATION, Duluth, GA (US)

( * ) Notice: Subject to any disclaimer, the term of this patent is extended or adjusted under 35 U.S.C. 154(b) by 1411 days.

(21) Appl. No.: 12/952,582

(22) Filed: Nov. 23, 2010

(65) Prior Publication Data

US 2012/0127307 A1 May 24, 2012

(51) Int. Cl.

| | |
|---|---|
| ***H04N 7/18*** | (2006.01) |
| ***G07F 7/06*** | (2006.01) |
| ***G07F 17/00*** | (2006.01) |
| ***G07G 1/00*** | (2006.01) |

(52) U.S. Cl.

CPC ............ *G07F 7/069* (2013.01); *G07F 17/005* (2013.01); *G07G 1/009* (2013.01)

(58) Field of Classification Search

USPC ............ 348/143; 705/1, 300, 36; 340/572.1

IPC ........................................................ H04N 7/18

See application file for complete search history.

(56) References Cited

U.S. PATENT DOCUMENTS

| | | | | |
|---|---|---|---|---|
| 7,774,233 | B2 | 8/2010 | Barber et al. | |
| 2005/0209947 | A1* | 9/2005 | Shafer | 705/36 |
| 2006/0116899 | A1* | 6/2006 | Lax et al. | 705/1 |
| 2007/0169132 | A1 | 7/2007 | Blust et al. | |
| 2007/0226142 | A1* | 9/2007 | Hanna et al. | 705/41 |
| 2008/0111691 | A1* | 5/2008 | Lee et al. | 340/572.1 |
| 2009/0144180 | A1* | 6/2009 | Blust et al. | 705/30 |

* cited by examiner

*Primary Examiner* — Neil Mikeska
(74) *Attorney, Agent, or Firm* — Peter H. Priest

(57) ABSTRACT

Techniques are described to substantially reduce a return of wrong DVD or return of a right DVD in an improperly sized DVD case to a DVD rental kiosk. An RFID tag on the DVD, as well as an RFID tag on the case, are sensed external to the kiosk. A controllable shutter normally closes the return slot and is driven open only upon detecting the correct predetermined condition or conditions. A supplemental camera may be employed to detect if a single DVD in its case is being placed proximate the return slot by the user. Help screens are employed as part of the above described system to reduce potential customer frustration from returning a DVD to the wrong DVD rental kiosk and the like.

20 Claims, 5 Drawing Sheets

CONTROLLABLE KIOSK RETURN GATE

FIELD OF THE INVENTION

The present invention relates generally to aspects of an improved kiosk for rental and sale of digital media, such as digital video discs (DVDs), and the like. More particularly, the present invention addresses improved kiosks and methods of their operation which advantageously address problems such as jamming and the like flowing from customers returning the wrong DVD or case to the kiosk.

BACKGROUND OF THE INVENTION

With DVD kiosks for rental and sale of DVDs becoming more and more prevalent, customers may be exposed to kiosks from multiple manufacturers operated by different operators on a daily or near daily basis. If the units employ different size and shape cases, a DVD in a case from one machine, such as a Redbox™ machine, returned to another machine, such as an NCR Blockbuster™ machine, may cause a jam as a result of being returned to the wrong machine. A service call to clear a jam may be expensive, and a jam taking a unit out of service will also typically result in a loss of business for the operator.

As such kiosks further multiply, a number of other issues may be anticipated or may possibly occur even if unanticipated. If a number of manufacturers settle on a common size case or container, consumers using multiple different machines may mistakenly return the wrong DVD to the wrong machine. Similarly, a consumer may put a DVD that he or she owns in a return container rather than the rental DVD that needs to be returned. Alternatively, a consumer might mistakenly return a DVD owned by the consumer in its own rental case or in a rental case for a particular machine, such as an NCR rental case, rather than the rental DVD in the rental case. A customer may even mistakenly try to return a DVD from one NCR Blockbuster™ machine operated by one operator to another such machine operated by a different operator. The above list is meant to be illustrative of the problem and not exhaustive of the possibilities.

SUMMARY OF THE INVENTION

While existing techniques for dealing with such issues may address some of the problems. The present invention contemplates a more robust solution to these and other problems flowing from incorrect returns, as well as, with potential efforts to jam or disable a machine.

One aspect of the invention addresses apparatus for reducing access to a rental kiosk by items not belonging to the rental kiosk comprising: means for sensing an RFID tag on an item proximate a return slot, but external to the rental kiosk; a processor for evaluating whether the RFID tag is for an item belonging to the rental kiosk; a shutter which controls return of items through the return slot and which is driven by the processor to open and allow entry only if the RFID tag is for an item belonging to the rental kiosk; and a display driven by the processor to inform a user to check the item if the processor determines the RFID tag is for an item not belonging to the rental kiosk.

A more complete understanding of the present invention, as well as further features and advantages of the invention, will be apparent from the following Detailed Description and the accompanying drawings.

DETAILED DESCRIPTION

Figure 1:
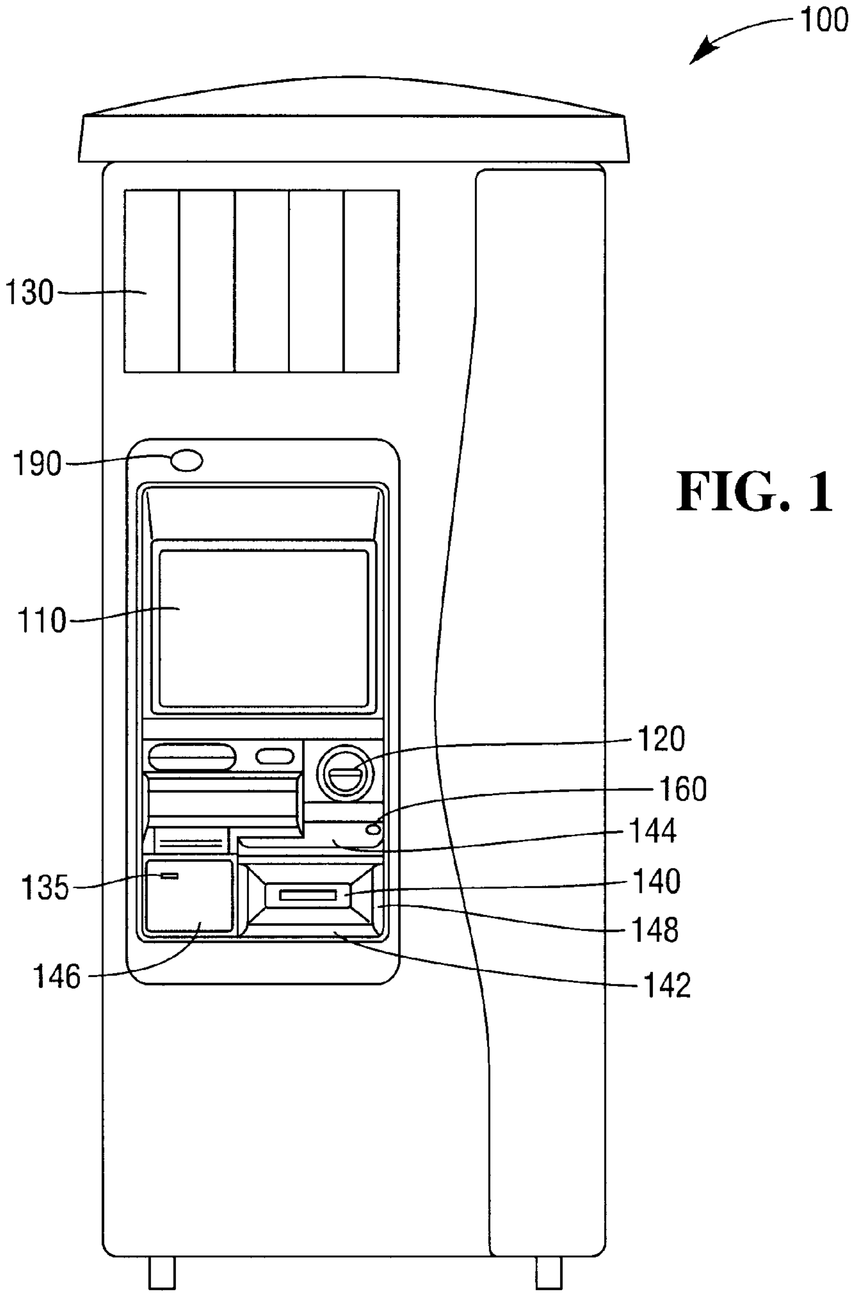
FIG. 1 shows a perspective view of a kiosk in accordance with the present invention.

FIG. 1 illustrates a kiosk 100 in accordance with the present invention. In one presently preferred embodiment, the present invention is embodied as an improvement upon an existing DVD kiosk, such as the NCR SelfServ Entertainment 2381 DVD rental kiosk. This product is designed for outdoor use and in locations where little or no supervision of its operation may occur over long periods of time. As such, improved security and reductions in malfunctioning such as jams are particularly advantageous.

The kiosk employs a touch screen display 110, a magnetic stripe card reader 120, a display area 130 for physical display of movie promotional material or for an optional liquid crystal display (LCD) (not shown), and customer receipt slot 135 for delivery of a customer receipt printed on a receipt printer (not shown).

In general, the teachings of the present invention may be readily adapted to the operation of wide array of existing DVD kiosks. For example, the general operation of kiosk 100 may generally follow that shown in FIGS. 28-35 and described by paragraphs [0130]-[0140] of U.S. Patent Application Publication No. 2007/0169132 published Jul. 19, 2007 which is incorporated herein in its entirety. Such operation is advantageously modified as discussed further below.

In accordance with the present invention, a delivery and return slot 140 for delivery and return of rental DVDs and its surrounding area, referred to herein as entryway 180, have been modified as discussed further herein. As seen in FIG. 1, the delivery and return slot 140 is found within the recess or entryway defined by bottom and top walls 142 and 144, and side walls 146 and 148, respectively. In accordance with the present invention, an RFID antenna 152 is placed above the delivery and return slot 140 and an RFID antenna 154 is placed below return slot 140. In one embodiment, the antennas 152 and 154 are embedded in the walls 142 and 144, or are located behind those walls inside the outer housing of kiosk 100. These walls are made of a plastic that does not significantly affect the antennas 152 and 154.

Figure 2:
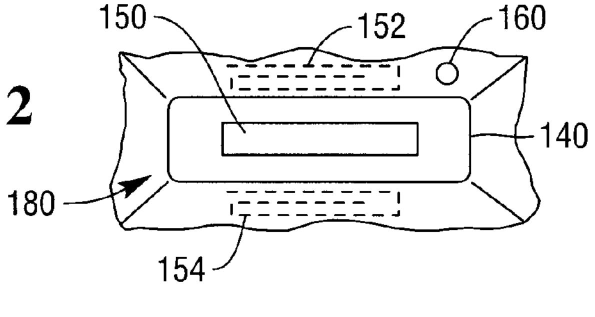
FIG. 2 shows a cutaway view of the entryway and return slot of the kiosk of FIG. 1 illustrating further details of a shutter in accordance with the present invention in its closed position preventing DVD return.

In addition to these RFID antennas, a gate or shutter 150, as seen in FIG. 2, normally closes the slot 140 to prevent access to the interior of kiosk 100 unless a DVD is sensed as properly being returned to its correct kiosk as discussed further below. In FIG. 1, the shutter is open and not visible. In the open position, a user can return a DVD to the kiosk 100 or receive a DVD therefrom.

Figure 3:
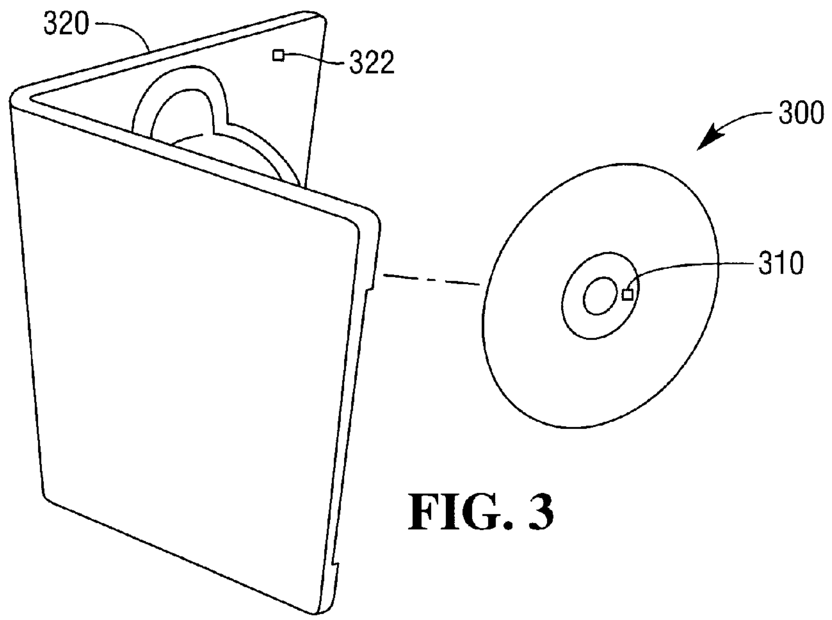
FIG. 3 shows an exemplary DVD and case arrangement in accordance with an embodiment of the present invention.

As seen in FIG. 3, in one embodiment of the invention, a DVD 300 has an RFID chip 310 mounted thereon. This RFID chip encodes information which when read by an RFID reader, such as reader 10 of FIG. 4, within the kiosk 100 can be processed to identify the DVD. Thus identified, the DVD can be matched with the customer returning it to close out a rental with the customer being charged appropriately, and for inventory control purposes, such as returning the DVD to storage and keeping track of its location therein for subsequent rental, and the like.

Figure 4:
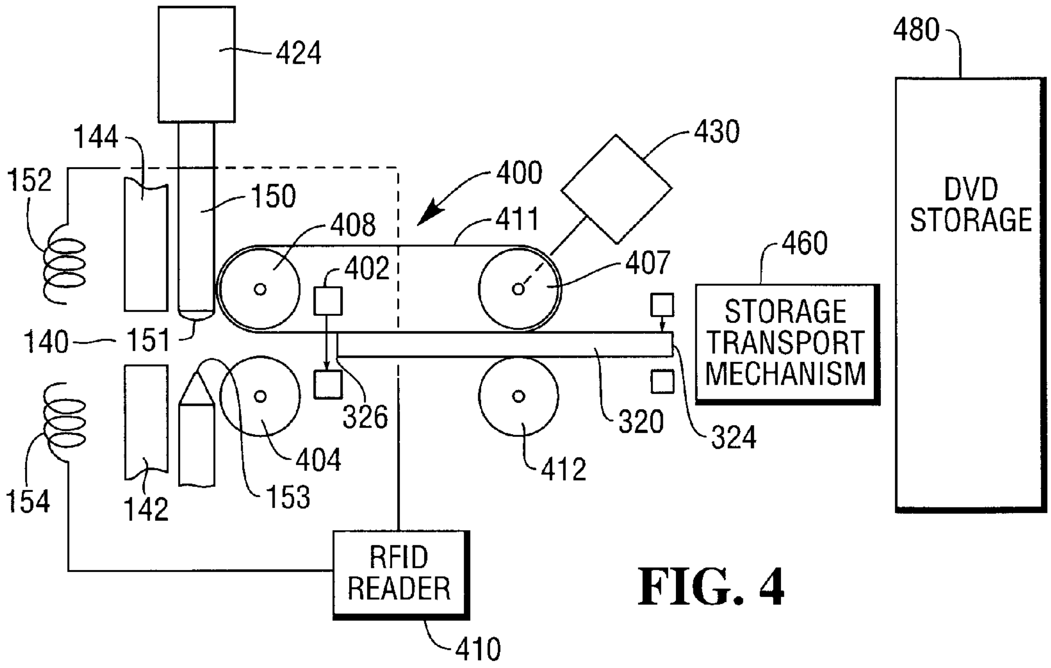
FIG. 4 is a schematic drawing illustrating additional details of the shutter of FIG. 2 and a transport for intake of DVDs in accordance with the present invention.

In FIG. 3, DVD 300 is shown with an associated case 320 which also has an identifying chip 322 mounted thereon. The RFID chip 322 could identify a particular case associated with DVD 300 where each case had promotional material for its associated DVDs as is the case for new DVDs for sale. However, in the present embodiment, all discs are associated with a common generic case so that if you rent five DVDs you can return them in any of the cases they were rented in. In this arrangement, RFID tag 322 simply identifies the case as being one designed for use with a kiosk, such as kiosk 100. As discussed further below by reading the RFID tags 310 and 322 and controlling the shutter 150, the kiosk 100 can insure that only DVD and cases from the kiosk 100 are returned thereto thereby substantially reducing jams, unnecessary maintenance, and customer confusion and aggravation FIG. 4 shows an intake transport mechanism 400 and further details of the shutter 150. In FIG. 4, antennas 152 and 154 are shown proximate to and above and below the return slot 140. Walls 142 and 144 are shown in cutaway. Solenoid 424 controllably drives shutter 150 from the open position shown in FIG. 4 to the closed position shown in FIG. 2. When the shutter 150 is open, a DVD in a case can be inserted through return slot 140. When its lead edge 324 is detected by first sensor 402, rollers 407, 408, 409 and 412 are driven to advance the case 320 into the kiosk 100. In FIG. 4, stepper motor 430 drives roller 407 and belt 411 in turn drives roller 408. It will be appreciated that intake transport mechanism 400 is illustrative and other intake transport arrangements may be suitably employed. When second sensor 324 detects leading edge 324 and trailing edge 326 has cleared first sensor 326, motor 430 is stopped and solenoid 424 drives shutter 150 closed. In one embodiment, end 151 of the shutter 150 is driven against a knife edge to cut a string, tape or the like attached to case 320 by an unscrupulous user.

From the position shown in FIG. 4, a storage transport mechanism 460 may grip case 320 and transport it to DVD storage 480. This storage transport mechanism 460 and DVD storage 480 may take the form shown and described in U.S. Patent Application Publication No. 2007/0169132 or any other form desired for a particular environment and application.

Figure 5:
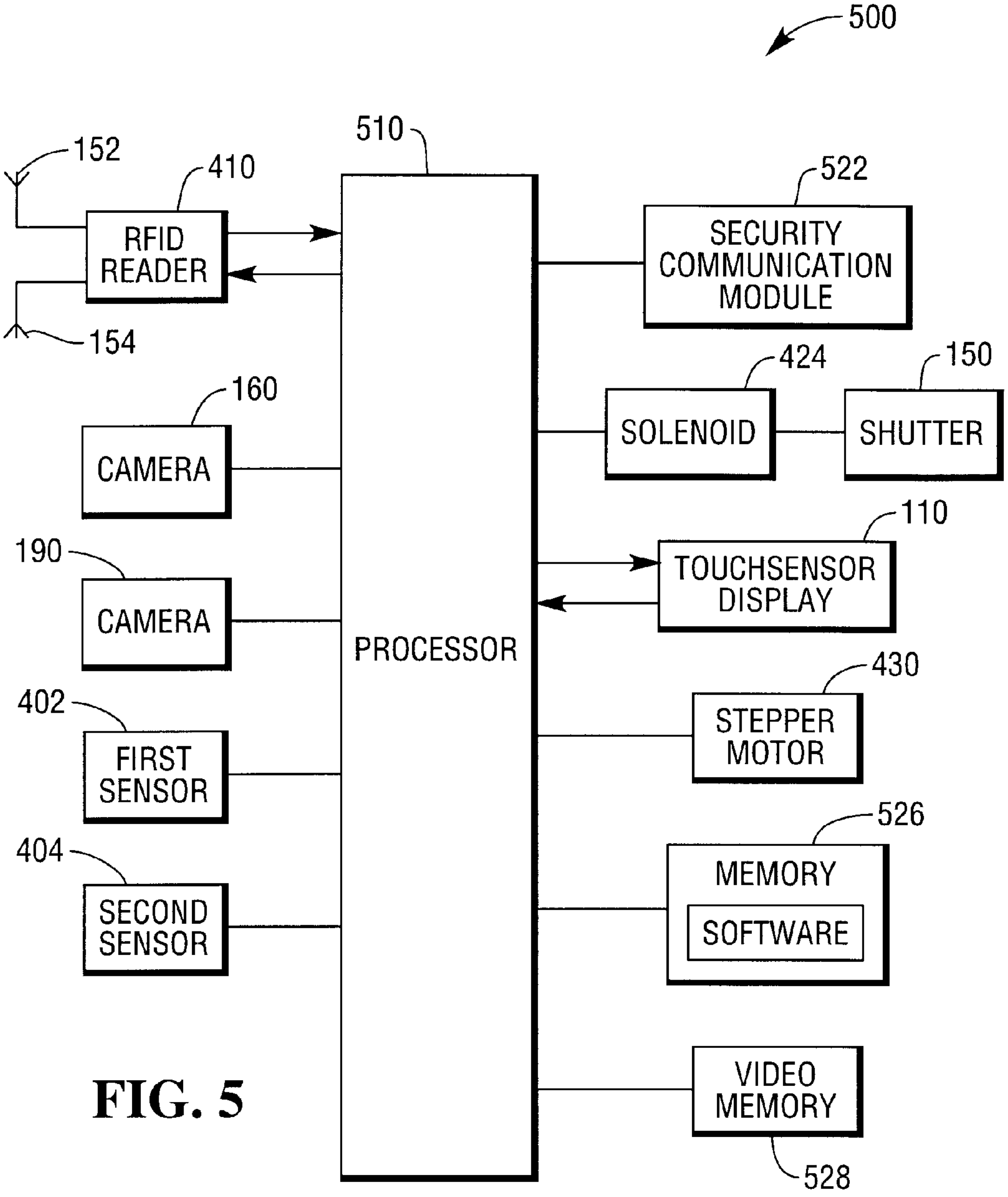
FIG. 5 shows a block diagram of a control circuit for control of the shutter in accordance with the present invention.

Turning to FIG. 5, this figure shows a block diagram of a programmed processor based control circuit 500 for control of the shutter 150, utilizing antennas 152 and 154 in conjunction with an RFID reader 410, and control of intake transport 400 as discussed further herein. As seen in FIG. 5, control circuit 500 includes a programmed processor 510 having memory 526 storing suitable software which when executed causes the processor 510 to operate as described herein. The processor 510 is also connected to receive inputs from RFID reader 410 and to provide inputs to control reading by the RFID reader 410. Processor 510 also receives inputs from the sensors 402 and 404, and user inputs from touch screen display 110.

Processor 510 also controllably drives solenoid 424 which in turn controls shutter 150, drives stepper motor 430, stores video from the cameras 160 and 190 in video memory 528, and also controls outgoing communication utilizing security communication module 522.

Figure 6A:
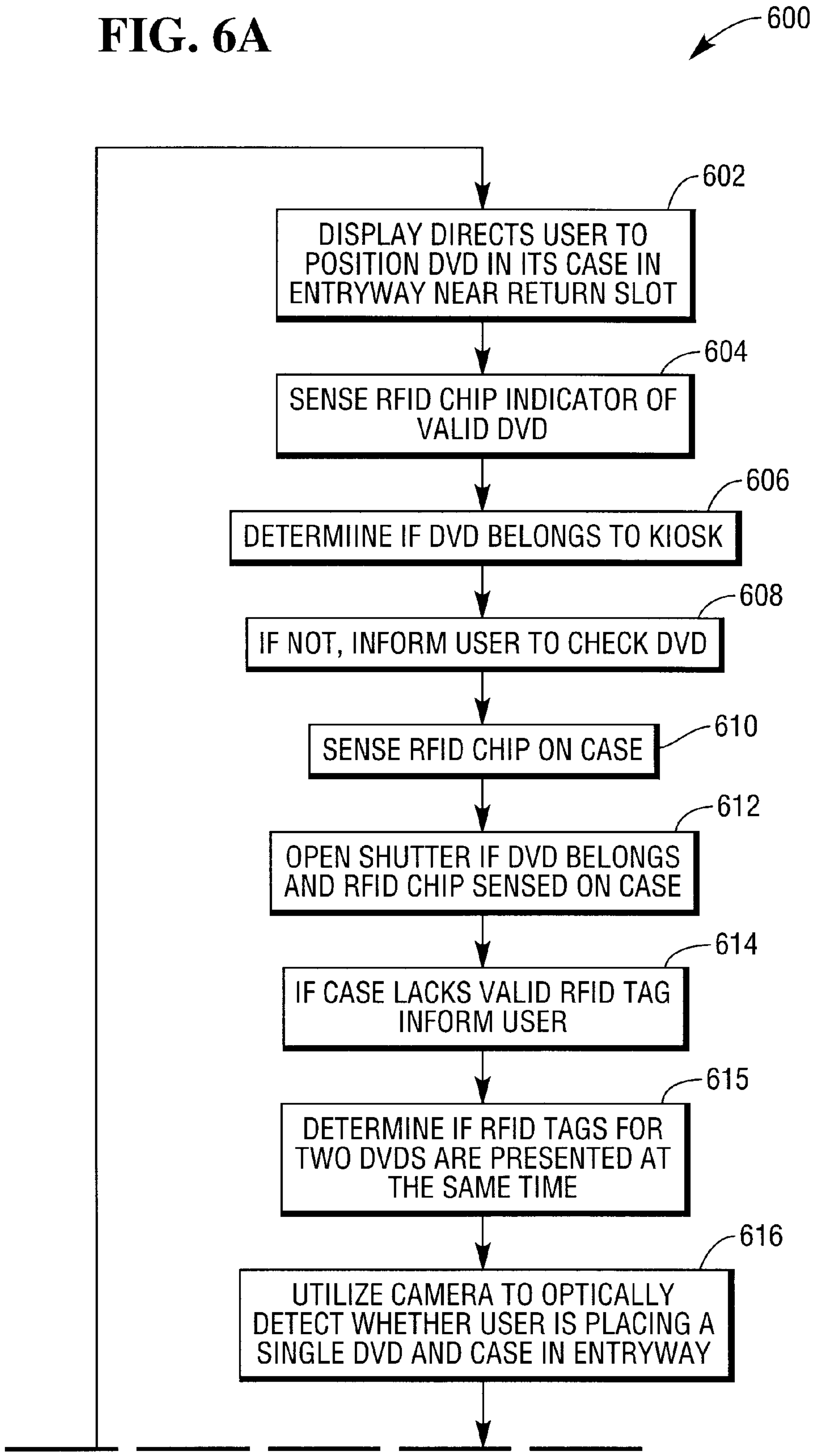
FIG. 6 shows a process of returning media such as DVDs in accordance with the present invention.
Figure 6B:
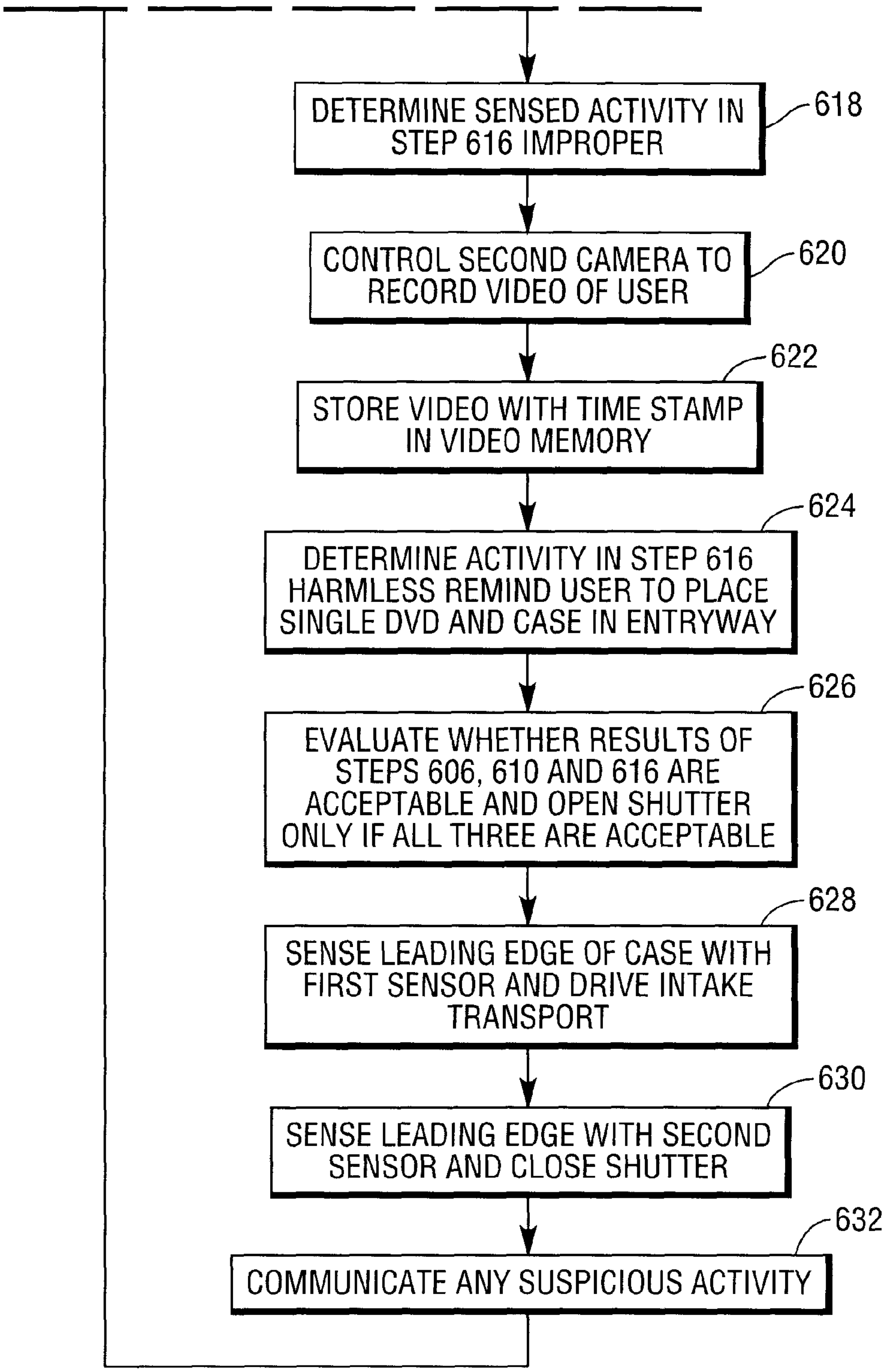

Turning to FIG. 6, at the point at which a user of kiosk 100 selects "return" to return a DVD inside its case utilizing touch screen 110, a sequence of display screens may guide the user as shown in the process 600 of FIG. 6. In step 602, the user is directed to position the DVD to be returned in its case in the entryway 180 near return slot 140. A pictorial or video representation of the action to be performed may be displayed on touch screen 110 as part of step 602. It will be recognized that an adaptive help process may be employed in which a novice or new user is provided with more extensive help screens than an experienced or veteran user. For example, a new user may be prompted to align the narrow edge of case 320 with return slot 140. By contrast, for an expert user, step 602 may be skipped and the expert user may simply position the DVD in its return case proximate the antennas 152 and 154. Sensing the RFID tags for the DVD and the case may open slot 150 and begin the process. The user's responsiveness to the help screens, the time taken to respond, or the time to successfully complete a step may be analyzed to dynamically adjust the help provided on an ongoing basis.

In step 604, an RFID chip on the DVD, such as chip 320 of FIG. 3 is sensed utilizing RFID reader 410 which energizes the RFID antennas 152 and 154 and senses the information encoded on chip 320 for example. In step 606, the information from chip 320 can then be processed by a programmed processor, such as processor 510 to determine if the DVD 300 belongs to the kiosk 100. If not, in step 608, a display screen can be utilized to inform the user to check the DVD as it is not recognized by the kiosk 100. The shutter 150 will not be opened thereby preventing return of an unknown DVD to the kiosk 100. Where the customer is mistakenly trying to return a Redbox DVD rental in a case which does not fit in the NCR Blockbuster kiosk, a potential jam, service call and customer frustration upon realizing the mistake are potentially avoided. As a further example, where the customer or a customer's child has mistakenly put a DVD owned by the customer in the case 320, customer confusion and frustration is again potentially avoided. To further help reduce such confusion and frustration, a display screen may be displayed with an "800" number to call for assistance, the receipt printer may be driven to printout further information or the like.

Optionally, in step 610, an RFID chip on the case, such as RFID chip 322 of FIG. 3 is also sensed. If the customer has placed a DVD, such as DVD 300 belonging to the kiosk 100 in a Redbox rental case which may jam the kiosk 100, this additional step 610 allows the RFID reader to read the chip 322 if present and the processor 510 can then logically AND that information with detection of the chip 320 before opening the shutter. In step 612, the shutter, such as shutter 150 of FIG. 2 is controllably opened if the results of preceding step or steps, such as steps 606 and 610, detect RFIDs chips for a valid DVD and case, respectively. For the example of a Redbox rental case, that case will not have an RFID tag like the RFID tag 322, and in step 614 a display screen can be utilized to inform the customer to check the DVD case and shutter 150 will not be opened.

Additionally, in step 615, the RFID reader may be employed to determine if two DVD RFID tags are being presented at the same time. If two are being detected, the display may be driven to advise the customer to present one item at a time.

In a further optional step 616, a solid state camera, such as camera 160 of FIGS. 1 and 2 is utilized to optically detect if the user is placing a single DVD and case in the entryway 180 proximate the return slot 140. Such detection may be part of an enhanced security package to prevent outright fraud or vandalism where an unscrupulous person attempts to utilize a first valid DVD and case to open the shutter 150 and then quickly insert something else in an attempt to vandalize the kiosk 100.

If the camera 160 is determined to be sensing activity deemed improper in step 618, for example, by processor 510 of FIG. 5, the processor 510 may control a second camera 190 to record video of the user in step 620. In step 622, that video is stored with a time stamp in video memory, such as the video memory 528 of FIG. 5. In case the activity is non-fraudulent and the result of inexperience, fumbling by the user or the like, the touch screen display 110 may be driven in step 624 by the processor 510 to display a screen to remind the user to only place a single DVD in its case in the entryway 180.

The camera output from camera 160 may be evaluated in conjunction with outputs from RFID reader 512 so that shutter 150 is not opened in step 626 if the activity is deemed questionable.

If in steps 606, 610 and 616, the necessary criteria are satisfactorily detected, shutter 150 is driven open, for example, by selectively driving solenoid 424 by processor 510, and the DVD in its proper case may be inserted. In step 628, if a first sensor 402 senses the leading edge 324 of the DVD case 320, intake transport 400 grips the DVD case and begins to drive it into the kiosk 100. In step 630, if the leading edge of the DVD case is sensed by a second sensor 404 which senses the leading edge has reached a certain predetermined point and the first sensor 402 is now sensing the DVD case's trailing edge 326 has passed, the shutter 150 is closed.

The process 600 loops back up to step 602 and the user may be invited to return a next item, or if all items have been returned to select an icon to continue with the process of completing the return. As part of an enhanced security package, in step 632, processor 510 may utilize the security communications module 522 to communicate suspicious activity to a central monitoring location utilizing email, a cell phone or the like, or to the police if evaluation of the relevant data warrants. A further optional use of the antennas is to detect that the DVD being rented has been taken by the customer and not left in the slot 140. As an example, the RFID reader 512 senses a DVD being rented as the customer removes it, and cameras 160 and 190 can be driven to record it being taken. This event appears as an output from the RFID reader indicative of a DVD RFID tag followed by the lack of such an output after passage of a predetermined relatively short period of time. Should the customer accidentally be interrupted and leave the DVD in the slot 140, the output indicative of a DVD RFID tag will still be occurring after a longer predetermined period of time. In such an event, the transport 400 can drive the DVD back into the kiosk 100, and the customer's record can be adjusted accordingly. The communications module 522 might also be controlled to email the customer.

While the present invention has been disclosed in the context of various aspects of presently preferred embodiments, it will be recognized that the invention may be suitably applied to other environments consistent with the claims which follow. For example, while the present disclosure focuses on kiosks for DVDs, it will be recognized that it is also applicable to kiosks for other digital media, such as CDs, video games and the like, and applies to any kiosk with return functionality where the value of the item is high enough to justify use of an RFID tag for tracking.

I claim:

1. Apparatus for reducing access to a rental kiosk by items not belonging to the rental kiosk comprising:

a delivery and return slot for delivery and return of rental items;

means for sensing an RFID tag on an item proximate the delivery and return slot in an entryway surrounding the delivery and return slot which is external to the rental kiosk, said means for sensing arranged external to the delivery and return slot;

a shutter which controls return of items through the delivery and return slot;

a processor for evaluating whether the RFID tag is for an item belonging to the rental kiosk while the shutter is closed and the item under evaluation is external to the rental kiosk and which drives the shutter open and allows entry only if the RFID tag is for an item belonging to the rental kiosk; and a display driven by the processor to inform a user to check the item if the processor determines the RFID tag is for an item not belonging to the rental kiosk.

2. The apparatus of claim 1 wherein the means for sensing comprises antennas arranged at the entryway above and below the delivery and return slot and an RFID reader.

3. The apparatus of claim 1 wherein the items comprise DVDs and wherein each DVD has an RFID tag thereon identifying the DVD as belonging to the rental kiosk.

4. The apparatus of claim 3 wherein the DVDs are rented in cases and each case also has an RFID tag.

5. The apparatus of claim 4 wherein the means for sensing is utilized to sense both the RFID tags on the DVDs and on the cases.

6. Apparatus for reducing access to a rental kiosk by items not belonging to the rental kiosk comprising:

means for sensing an RFID tag on an item proximate a return slot, but external to the rental kiosk;

a processor for evaluating whether the RFID tag is for an item belonging to the rental kiosk;

a shutter which controls return of items through the return slot and which is driven by the processor to open and allow entry only if the RFID tag is for an item belonging to the rental kiosk;

a display driven by the processor to inform a user to check the item if the processor determines the RFID tag is for an item not belonging to the rental kiosk; and a camera arranged to optically view an entryway surrounding the return slot and external to the rental kiosk.

7. The apparatus of claim 6 wherein the processor evaluates an output from the camera to determine if a user is presenting a single DVD in its case for return.

8. The apparatus of claim 7 wherein the processor does not drive the shutter open if the processor determines that the user is presenting more than a single DVD in its case for return, and a second camera is controlled to record video of the user which is stored with a time stamp.

9. The apparatus of claim 3 wherein the processor evaluates whether RFID tags for two DVDs are being sensed by the means for sensing at the same time.

10. The apparatus of claim 9 wherein the display is driven by the processor to inform the user to present a single DVD at a time.

11. A method for reducing access to a rental kiosk by items not belonging to the rental kiosk comprising:

sensing an RFID tag on an item proximate a return slot while the item is external to the rental kiosk utilizing a sensor external to the return slot;

evaluating whether the RFID tag is for an item belonging to the rental kiosk utilizing a processor;

utilizing a shutter to control return of items through the return slot, the shutter being driven by the processor to open and allow entry only if the RFID tag is for an item belonging to the rental kiosk; and informing a user to check the item if the processor determines the RFID tag is for an item not belonging to the rental kiosk utilizing a display driven by the processor.

12. The method of claim 11 wherein the sensor comprises antennas arranged above and below the entry slot, and utilizing the antennas and an RFID reader for sensing the RFID tag.

13. The method of claim 11 wherein the items comprise DVDs and wherein each DVD has an RFID tag thereon, and the method further comprises:

identifying the DVD as belonging to the rental kiosk.

14. The method of claim 11 wherein the DVDs are rented in cases and each case also has an RFID tag, and the method further comprises:

sensing the RFID tags on the cases.

15. The method of claim 14 wherein the shutter is driven open only upon sensing both an RFID tag for a DVD and an RFID tag on a case at the same time.

16. The method of claim 13 further comprising:

optically viewing an entryway proximate the return slot utilizing a camera.

17. The method of claim 16 further comprising:

evaluating an output from the camera to determine if a user is presenting a single DVD in its case for return utilizing the processor.

18. The method of claim 17 further comprising:

determining that the user is presenting more than a single DVD in its case for return utilizing the processor and not driving the shutter open.

19. The method of claim 11 further comprising:

evaluating utilizing the processor whether RFID tags for two items are being sensed at the same time.

20. The method of claim 19 further comprising:

driving the display by the processor to inform the user to present a single item at a time.

* * * * *